March 28, 1933.   P. M. MILLER   1,903,189
MOTOR VEHICLE WHEEL
Filed March 14, 1930   3 Sheets-Sheet 2

Inventor
PHILIP M. MILLER
By Richey & Watts
Attorneys

March 28, 1933.　　　P. M. MILLER　　　1,903,189
MOTOR VEHICLE WHEEL
Filed March 14, 1930　　　3 Sheets-Sheet 3

Inventor
PHILIP M. MILLER
By Richey & Watts
Attorneys

Patented Mar. 28, 1933

1,903,189

UNITED STATES PATENT OFFICE

PHILIP M. MILLER, OF CLEVELAND, OHIO, ASSIGNOR TO MILLER DEVICES INC., OF NEW YORK, N. Y., A CORPORATION OF NEW YORK

MOTOR VEHICLE WHEEL

Application filed March 14, 1930. Serial No. 435,815.

The present invention relates to automobile wheels in general and has for its object to provide what is known as an all-metal vehicle wheel of the type of wheels such as are used as road wheels and particularly those which are used with light and heavy duty passenger and commercial cars, the purpose being to construct a light, strong, self-cooling artillery type spider wheel the manufacture of which may be easily carried out and which will result in a superior product.

The nature and other objects of the invention will be better understood from the description of the particular illustrative embodiment thereof for the purpose of which description reference should be had to the accompanying drawings forming a part hereof and in which—

Fig. 4 is a detail view in elevation of the spider member looking from the inboard side thereof;

Figure 1:
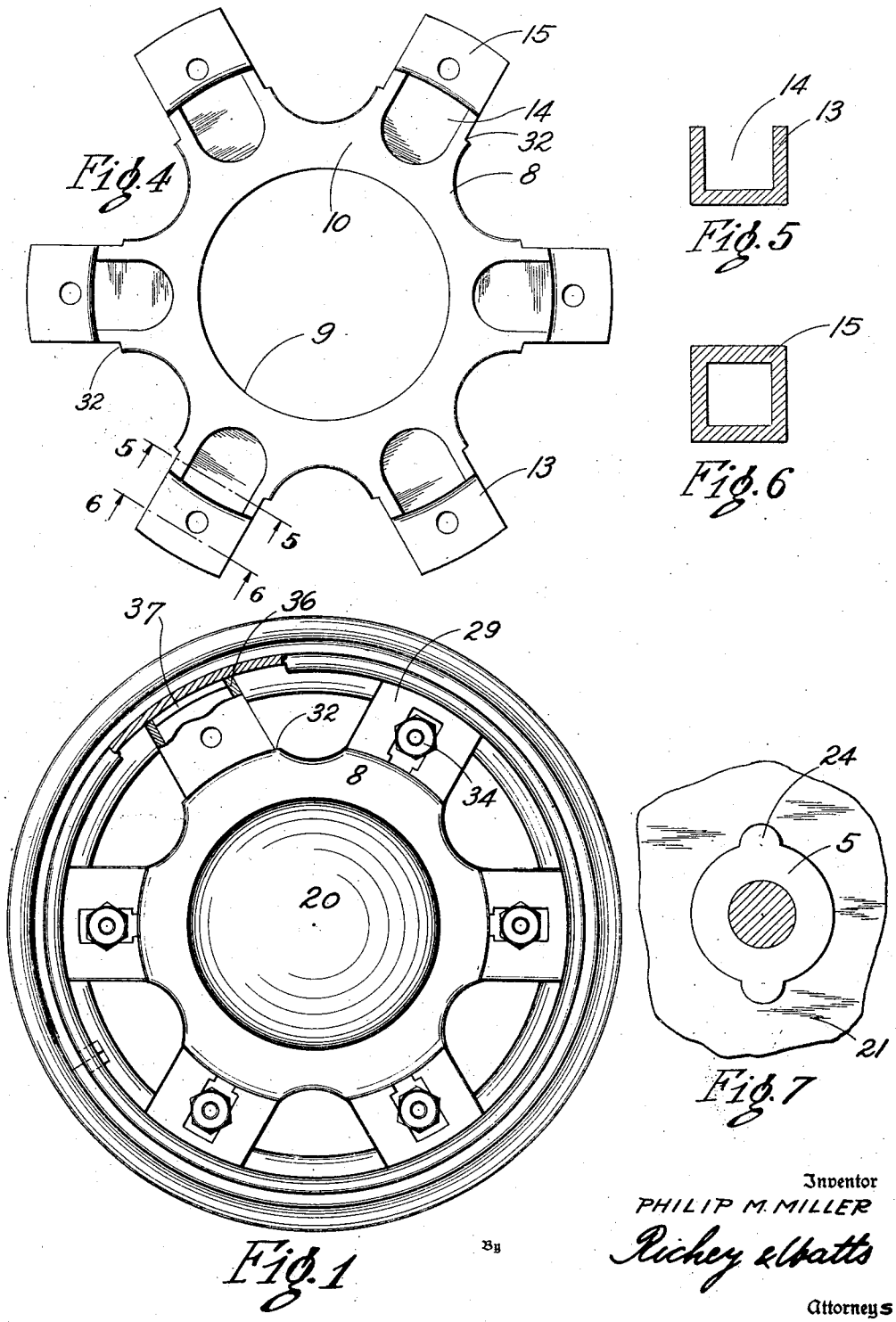
Figure 1 is a view in outboard side elevation of a wheel constructed in accordance with the features of the invention.

Figs. 5 and 6 are sectional views of the spider spokes taken respectively on the lines 5—5 and 6—6, Fig. 4;

Fig. 7 is a fragmentary view of the hub barrel and adjacent brake drum as viewed from the inboard side of the wheel, showing an axle shaft in section and the manner of keying the drum to the said barrel.

Referring in detail to the drawings, the nave portion of the wheel comprises a hub barrel 5 which has formed integrally therewith a radially extended disk-like wall 6 which terminates in a beveled peripheral supporting flange 7. Since the spider member is preferably of cast metal construction, the wall 6 is extended radially to provide a relatively large central area which involves a comparatively small amount of metal and is open to provide a ventilating chamber. The radial disk-like wall 6 is shown in detail in elevation in Figs. 3 and 3a. This member may be formed of hardened metal and is preferably reinforced by ribs or like members 6a, which may be formed in any suitable manner. Mounted on the bearing face 7a of the peripheral flange 7 is a spider member, generally designated at 8, and shown more or less in detail in Fig. 4. This spider member is formed with a relatively large central opening 9 which is of a diameter to provide a snug fit on the peripheral flange 7. The body wall 10 of the spider is relatively heavy in construction to provide a rigid member, and the radially inner bearing face of the wall 10 is beveled reversely as at 11 and 12, note Fig. 2. The beveled face 11 fits on the flange 7a, and the reversely beveled surface 12 faces the outboard side of the wheel for a purpose to be explained.

The spokes of the spider member are of open construction and are relatively short, due to the fact that the radial wall 6 occupies a large area of the diameter of the wheel. The spokes of the spider are designated at 13, note Figs. 4, 5 and 6. The inboard side of each spoke is of open channel construction at the base thereof, as at 14, while the end of the spoke is closed as at 15, note Fig. 6. Between the spokes, the wall of the spider is of arched contour and provides a reinforced construction which has a marked beauty of design. The spider is of the free spoke end type, and the ends of the spokes have a particular rim mounting construction which is described and claimed in my copending application Serial No. 375,726, filed July 3, 1929.

Figure 2:
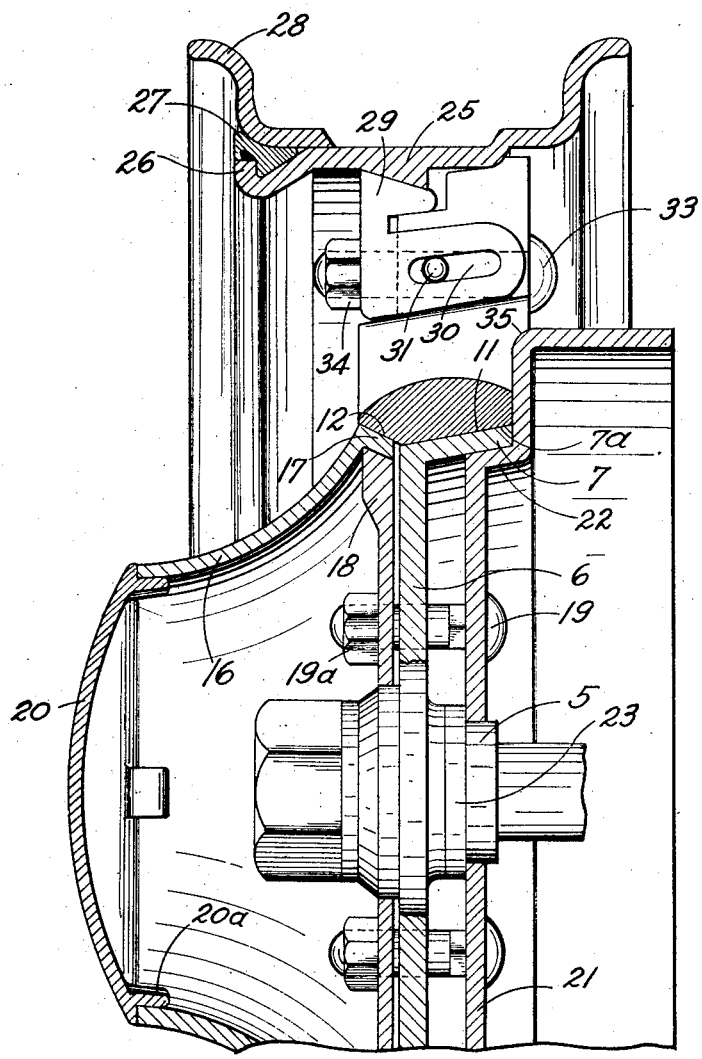
Fig. 2 is a view in transverse section with a portion of the wheel omitted to conserve space.
Figure 3:
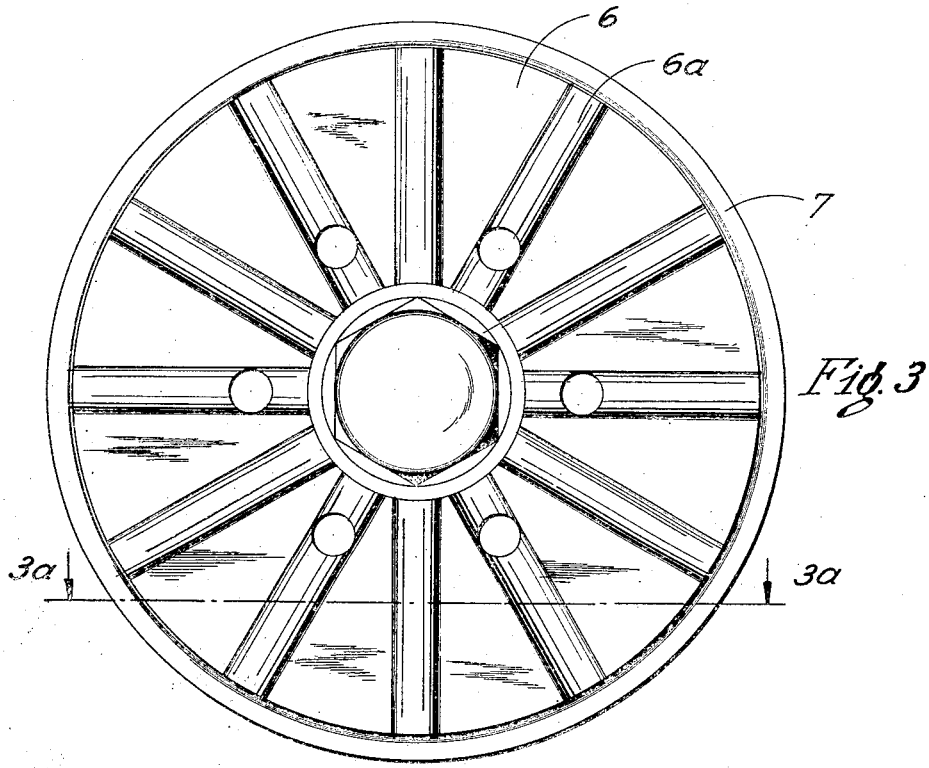
Fig. 3 is a detail view in elevation of the hub member.
Figure 3A:
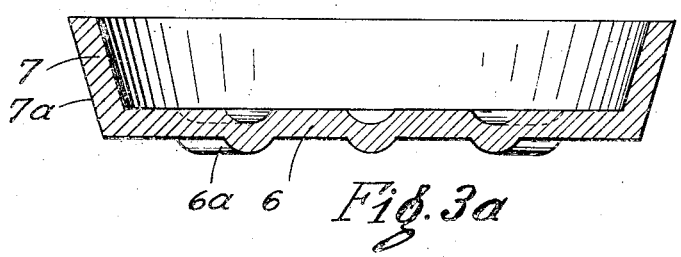
Fig. 3a is a sectional view of said member taken on the line 3a—3a, Fig. 3.

A nave covering shell 16 is provided and is formed with an inwardly turned peripheral flange 17, note particularly Fig. 2. This shell may be of any suitable material such as heavy sheet metal and may be chrome plated or otherwise treated to enhance the beauty of the wheel. The inwardly turned flange 17 of the shell is adapted to fit against the face 12 of the spider member. A disk-shaped clamp 18 is provided which engages the flange 17 of the shell member and clamps the latter together with the spider member in position on the flange 7a of the radial disk member 6, the parts being held in clamped assembled position by means of bolts 19 provided with nuts 19a.

The shell 16 is preferably of arched contour and at its outer end is provided with a cap 20. This cap is preferably frictionally engaged on said shell by means of lugs 20a, so that the cap may be readily removed when it is desired to gain access to the interior of the assembly.

It will be seen that by removing the cap 20, access is gained to the nuts 19a of the bolts 19, so that the spider 8 and clamping member 18 may be easily demounted from the hub portion of the wheel.

The brake drum is generally designated at 21 and the web of said drum is preferably formed with an annular shouldered inset 22, note Fig. 2. This annular shouldered inset is adapted to fit flush within the peripheral flange 7 of the hub disk 6 and to provide a firm support for the wheel at this point. As shown, the web is of solid construction and is provided with a central opening for the hub barrel 5 which is formed with an annular shoulder 23 against which the web is adapted to fit. By referring to Fig. 7, it will be noted that the web of the drum is keyed to the said barrel as at 24, thereby providing an additional drive connection between the hub and the wheel. Since the web fits on the hub barrel 5, the latter forms a firm support for the web which, in turn, forms a support for the wheel spider. Thus all road shocks and strains are transmitted in a direct line through the spider member to the web of the drum and thence to the barrel. The bolts 19 are passed through the web of the drum so that the drum and the remaining parts of the wheel are held in immovable clamped and keyed relation.

A tire rim of any suitable construction may be mounted on the free spoke ends of the spider member. The rim shown is of the gutter type and comprises a base member 25 which is formed with an outboard gutter 26 adapted to receive a wedge ring 27 on which the outboard flange 28 of the rim is mounted.

The mounting lugs for the rim are preferably of the type shown and described in my application above noted and consist of a sliding lug 29 which is slotted as at 30, note Fig. 2, to receive a retainer pin 31 which is passed through and permanently engaged with the end of the spoke, the lugs 29 having a transverse sliding movement on shoulders 32, see Fig. 4, formed on the sides of the spokes. Locking bolts 33 and nuts 34 are provided for the lugs 29. To demount the rim, it is only necessary to remove the nuts 34 to permit the lugs 29 to move outwardly a limited distance. As the lugs move outwardly they also move radially inwardly thereby freeing the rim with respect to the spoke ends.

The wall of the brake drum which extends beyond the flange 7a is adapted to fit against the inboard side of the spokes of the spider member over the channel portions 14 of the spokes 13 and close said openings thereby preventing the entrance of foreign matter such as dirt, dust, mud and the like into the interior of the wheel. This radial projecting portion of the drum also fits into a recessed portion as at 35, Fig. 2, and forms an additional support for the spokes of the spider member. Beyond the channel portions 14 of the spokes, the latter are closed as previously noted in connection with Fig. 6.

It is preferred to provide a driving connection between the rim and the spider member as shown in Fig. 1. The base of the rim may be formed with transverse bosses or projections 36 which are adapted to fit over a projecting portion 37 on the end of the spoke. By this means a driving connection is provided between the rim and the spider member, which also serves as a centering and positioning means when the rim is mounted on said member.

From the foregoing, it will be seen that I have provided a cast metal wheel which may be used for light and heavy duty automotive vehicles, is light in weight and yet possesses ample strength, is self-ventilating, has beauty of design and simulates the conventional wooden spoked artillery type wheel.

Having thus described my invention, what I desire to secure by Letters Patent is:

1. A wheel assembly for motor vehicles comprising a hub formed with an annular disk-like radial wall which terminates in a tapered peripheral flange, a spoked spider member mounted on the outer face of said flange, means for clamping the spider member in position on the flange, and a drum member having a driving connection with the hub and formed with an annular shoulder which fits against the inner face of said flange and reinforces the latter.

2. A wheel assembly for motor vehicles comprising a hub proper formed with an annular disk-like radial wall which terminates in a tapered peripheral flange, a spider member fitted on the outer face of said flange and provided with relatively short channeled spokes, means for clamping the spider member in position on the flange, and a drum member having a driving connection with the hub and formed with an annular shouldered portion which fits against the inner face of said flange and wedges the latter between the said shouldered portion and the spoked spider member, the wall of the brake drum which extends radially beyond said shouldered portion fitting against and closing the channels in said spokes.

3. A wheel assembly for motor vehicles comprising a hub proper formed with a radial disk-like wall which terminates in a tapered peripheral flange, a drum member having a driving connection with the hub and formed with a shouldered portion which fits against the inner face of said flange and reinforces the latter, a spoked spider member fitted on the outer face of said flange, and means for locking the spider member in position on said flange including a clamping plate which is secured to the said disk-like wall and is formed with a beveled periphery which exerts a wedging action on the body of the spider member.

4. A wheel assembly for motor vehicles comprising a hub proper formed with a radial disk-like wall which terminates in a tapered peripheral flange, a drum member having a driving connection with the hub and formed with a shouldered portion which fits against the inner face of said flange and reinforces the latter, a spoked spider member fitted on the outer face of said flange, a clamping plate removably connected to said disk-like wall, and a shell member surrounding the clamping plate and the end of the hub to conceal the latter parts from exterior view and complete the symmetrical lines of the wheel, said shell member being formed with a beveled peripheral flange which is wedged between the beveled periphery of the clamping plate and the spider member.

5. A wheel assembly for motor vehicles comprising a hub proper formed with a radial disk-like wall which terminates in a tapered peripheral flange, a drum member having a driving connection with the hub and formed with a shouldered portion which fits against the inner face of said flange and reinforces the latter, a spoked spider member formed with an annular body portion having a relatively large opening therein and a beveled bearing surface adapted to fit on the outer face of said flange, means for locking the spider member in position on said flange, and a shell member locked between the body portion of the spider and said locking means and surrounding the latter and the hub to conceal said parts from exterior view and complete the symmetrical lines of the wheel.

6. A wheel assembly for motor vehicles comprising a hub proper formed with a radial disk-like wall which terminates in a beveled peripheral flange, a drum member having a driving connection with the hub and formed with a shouldered portion which fits into said flange and reinforces the latter, a spoked spider member formed with an annular body portion having a relatively large opening therein and transversely inwardly and outwardly inclined bearing surfaces, the inwardly inclined surface being adapted to fit on the outer face of said beveled flange, and means for locking said spider member in position on said flange comprising a locking plate which is secured to the wall of the hub and the drum member and is provided with a beveled periphery adapted to co-act with the outwardly inclined bearing surface of the body of the spider member.

PHILIP M. MILLER.